United States Patent
Aso et al.

(10) Patent No.: US 10,044,239 B2
(45) Date of Patent: Aug. 7, 2018

(54) STATOR OF ELECTRIC MOTOR, ELECTRIC MOTOR, AIR CONDITIONER, AND METHOD OF MANUFACTURING STATOR OF ELECTRIC MOTOR

(71) Applicant: Mitsubishi Electric Corporation, Tokyo (JP)

(72) Inventors: Hiroki Aso, Tokyo (JP); Mamoru Kawakubo, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 432 days.

(21) Appl. No.: 14/772,138

(22) PCT Filed: Mar. 19, 2014

(86) PCT No.: PCT/JP2014/057497
§ 371 (c)(1),
(2) Date: Sep. 2, 2015

(87) PCT Pub. No.: WO2014/148537
PCT Pub. Date: Sep. 25, 2014

(65) Prior Publication Data
US 2016/0036279 A1    Feb. 4, 2016

(30) Foreign Application Priority Data

Mar. 21, 2013   (WO) ................. PCT/JP2013/058133
Mar. 21, 2013   (WO) ................. PCT/JP2013/058134

(51) Int. Cl.
*H02K 3/50* (2006.01)
*H02K 3/28* (2006.01)
(Continued)

(52) U.S. Cl.
CPC ............ *H02K 3/28* (2013.01); *H02K 3/522* (2013.01); *H02K 5/225* (2013.01); *H02K 15/12* (2013.01);
(Continued)

(58) Field of Classification Search
CPC .......... H02K 2203/03; H02K 2203/06; H02K 2203/09
See application file for complete search history.

(56) References Cited

FOREIGN PATENT DOCUMENTS

| JP | H07-003810 U | 1/1995 |
| JP | 2001-178062 A | 6/2001 |

(Continued)

OTHER PUBLICATIONS

Office Action dated Jan. 16, 2017 issued in corresponding CN patent application No. 201480013676.2 (and partial English translation).
(Continued)

*Primary Examiner* — Ramon M Barrera
(74) *Attorney, Agent, or Firm* — Posz Law Group, PLC

(57) ABSTRACT

A lead wire wiring component includes a lead wire guide that guides power supply lead wires and sensor lead wires to a lead wire leading component. The lead wire leading component includes projection portions that can be assembled to the lead wire guide. The projection portions are detached from the lead wire guide for molding such that the lead wire leading component is detached from the lead wire wiring component during the molding.

13 Claims, 12 Drawing Sheets

(51) Int. Cl.
| | |
|---|---|
| *H02K 3/52* | (2006.01) |
| *H02K 5/22* | (2006.01) |
| *H02K 15/12* | (2006.01) |
| H02K 15/02 | (2006.01) |
| H02K 5/10 | (2006.01) |
| H02K 5/08 | (2006.01) |

(52) U.S. Cl.
CPC ................ *H02K 5/08* (2013.01); *H02K 5/10* (2013.01); *H02K 15/02* (2013.01); *H02K 2203/03* (2013.01); *H02K 2203/06* (2013.01); *H02K 2203/09* (2013.01)

(56) References Cited

FOREIGN PATENT DOCUMENTS

| | | | |
|---|---|---|---|
| JP | 2001-309600 A | 11/2001 |
| JP | 2004-135439 A | 4/2004 |
| JP | 2004-350346 A | 12/2004 |
| JP | 2007-228667 A | 9/2007 |
| JP | 2009-112067 A | 5/2009 |
| JP | 2010-028909 A | 2/2010 |
| JP | 2010-035365 A | 2/2010 |
| JP | 2010-130833 A | 6/2010 |
| JP | 2010-273525 A | 12/2010 |

OTHER PUBLICATIONS

International Search Report of the International Searching Authority dated Jun. 17, 2014 for the corresponding international application No. PCT/JP2014/057497 (and English translation).
Extended European Search Report dated Oct. 5, 2016 issued in corresponding EP patent application No. 14770265.8.

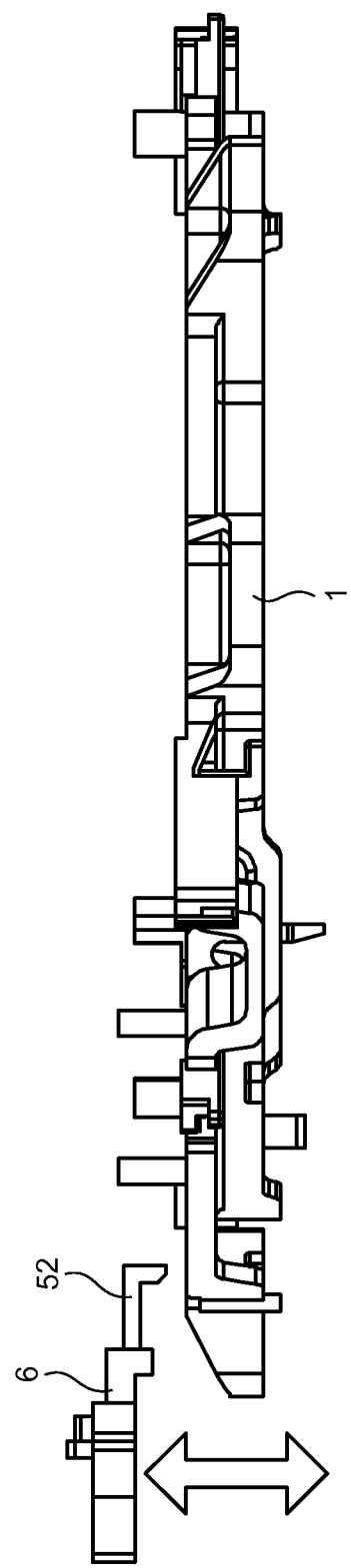

STATOR OF ELECTRIC MOTOR, ELECTRIC MOTOR, AIR CONDITIONER, AND METHOD OF MANUFACTURING STATOR OF ELECTRIC MOTOR

CROSS REFERENCE TO RELATED APPLICATION

This application is a U.S. national stage application of International Patent Application No. PCT/JP2014/057497 filed on Mar. 19, 2014, which claims priority to International Patent Application No. PCT/JP2013/058133 filed on Mar. 21, 2013 and International Patent Application No. PCT/JP2013/058134 filed on Mar. 21, 2013, the disclosures of which are incorporated herein by reference.

TECHNICAL FIELD

The present invention relates to a stator of an electric motor, an electric motor, an air conditioner, and a method of manufacturing the stator of the electric motor.

BACKGROUND

Patent Literature 1 discloses a motor stator, which includes a stator core formed with a cylindrical yoke, evenly spaced teeth projecting radially, and slots formed by the teeth and the yoke, in which windings are provided on the teeth with an insulator formed over the entire circumference of the teeth therebetween, and which is covered with molding resin. In the motor stator, a watertight partition wall having at least a dual structure and extending in a stacking thickness direction of the stator core is provided on one end face of the yoke and is integrally formed with the insulator, the connections between the ends of the windings and power supply lead wires are housed inside the watertight partition wall, and the stator core, the insulator, the windings, and the watertight partition wall are covered with the molding resin. Such a structure improves the reliability against water entry into the joints.

Patent Literature 2 discloses an electric motor stator including a stator assembly, a substrate including a position detection sensor circuit formed thereon, a lead wire wiring component, a power-supply-lead-wire retaining component assembled to the leading portion of the lead wire wiring component to retain power supply lead wires, and a sensor-lead-wire retaining component assembled to the leading portion of the lead wire wiring component to retain sensor lead wires. The power supply lead wires and the sensor lead wires are drawn to the outside in a two stage manner at the front and the back of the leading portion.

PATENT LITERATURE

Patent Literature 1: Japanese Patent Application Laid-Open No. 2004-350346
Patent Literature 2: Japanese Patent Application Laid-Open No. 2010-273525

The conventional molded electric motor described in Patent Literature 1 poses a problem of increased cost because the connections between the ends of the windings and the power supply lead wires are covered with a heat shrinkable tube that includes an adhesive layer. Additionally, Patent Literature 1 does not describe a molded electric motor that includes a sensor substrate.

In the case of the stator of the conventional molded electric motor described in Patent Literature 2, a leading component, which is a resin molding and on which the power supply lead wires and the sensor lead wires are laid, is assembled directly to the sensor substrate. Furthermore, a part of the leading component is in contact with the outer periphery of the stator core. Thus, the leading component may serve as an entry path into the sensor substrate for moisture if the moisture enters along the interface of the leading component.

SUMMARY

The present invention has been achieved in view of the above, and an object of the present invention is to provide a stator of an electric motor, an electric motor, an air conditioner, and a method of manufacturing the stator of the electric motor that inhibit the entry of moisture along the interface between a lead wire leading component and molding resin and thereby enables improvement in quality and reduction in cost.

In order to solve the above problems and achieve the object, a stator of an electric motor according to an aspect of the present invention includes: a stator; a lead wire wiring component that is assembled to one end of the stator in an axial direction and on which a lead wire is laid; a lead wire leading component leading the lead wire; and a molding resin portion integrally covering the stator, the lead wire wiring component, and the lead wire leading component, wherein the lead wire wiring component includes a lead wire guide guiding the lead wire to the lead wire leading component, the lead wire leading component is capable of being assembled to the lead wire guide, and the lead wire leading component is detached from the lead wire guide in the molding resin portion.

The present invention allows a lead wire leading component to be detached from a lead wire wiring component before molding and thus produces an effect of being capable of inhibiting the entry of moisture along the interface between the lead wire leading component and a molding resin portion, thereby enabling improvement in quality and reduction in cost.

BRIEF DESCRIPTION OF DRAWINGS

FIG. 13 is a sectional view of the lead wire wiring component with the lead wire leading component according to the second embodiment separated therefrom.

DETAILED DESCRIPTION

Exemplary embodiments of a stator of an electric motor, an electric motor, an air conditioner, and a method of manufacturing the stator of the electric motor according to the present invention will now be described in detail with reference to the drawings. The present invention is not limited to the embodiments.

First Embodiment

Figure 1:
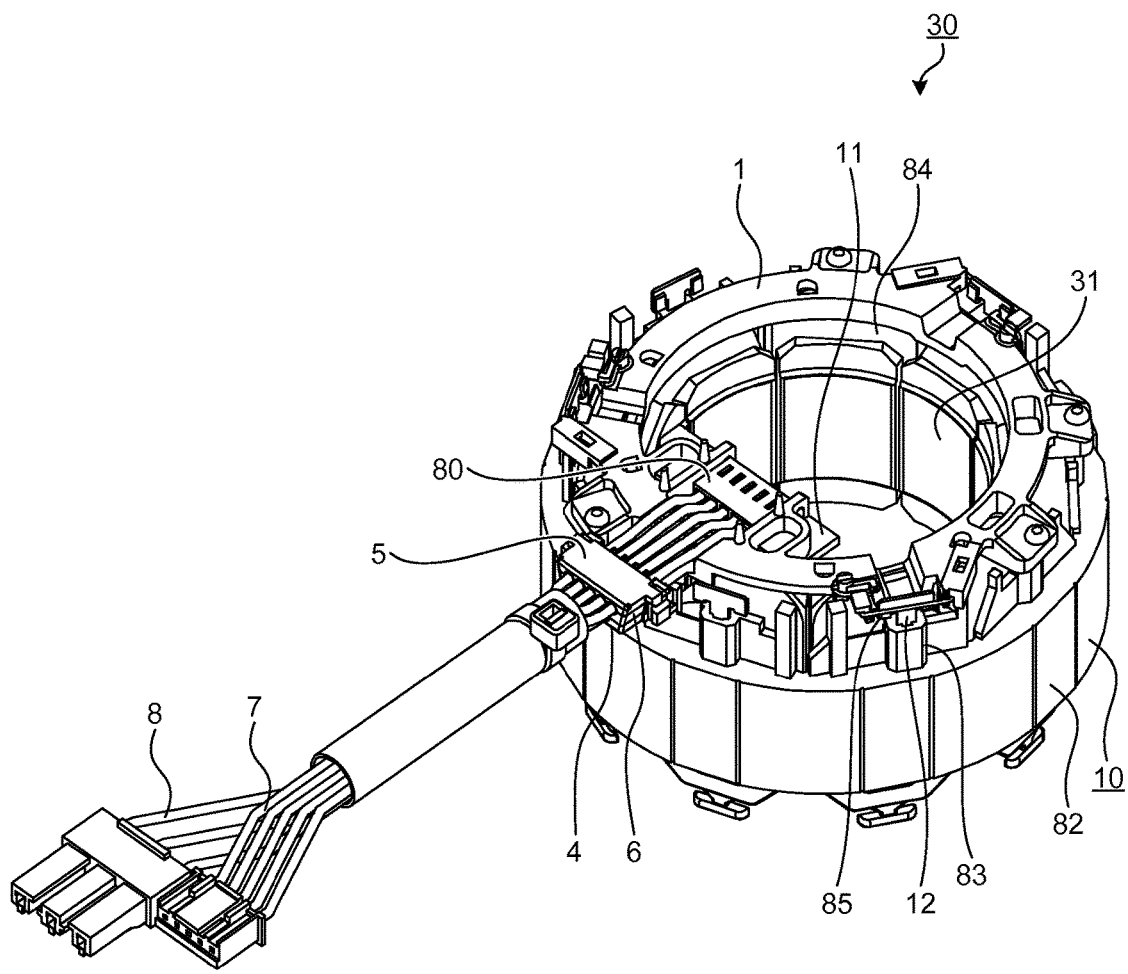
FIG. 1 is a perspective view illustrating the configuration of a stator assembly of an electric motor according to a first embodiment.
Figure 2:
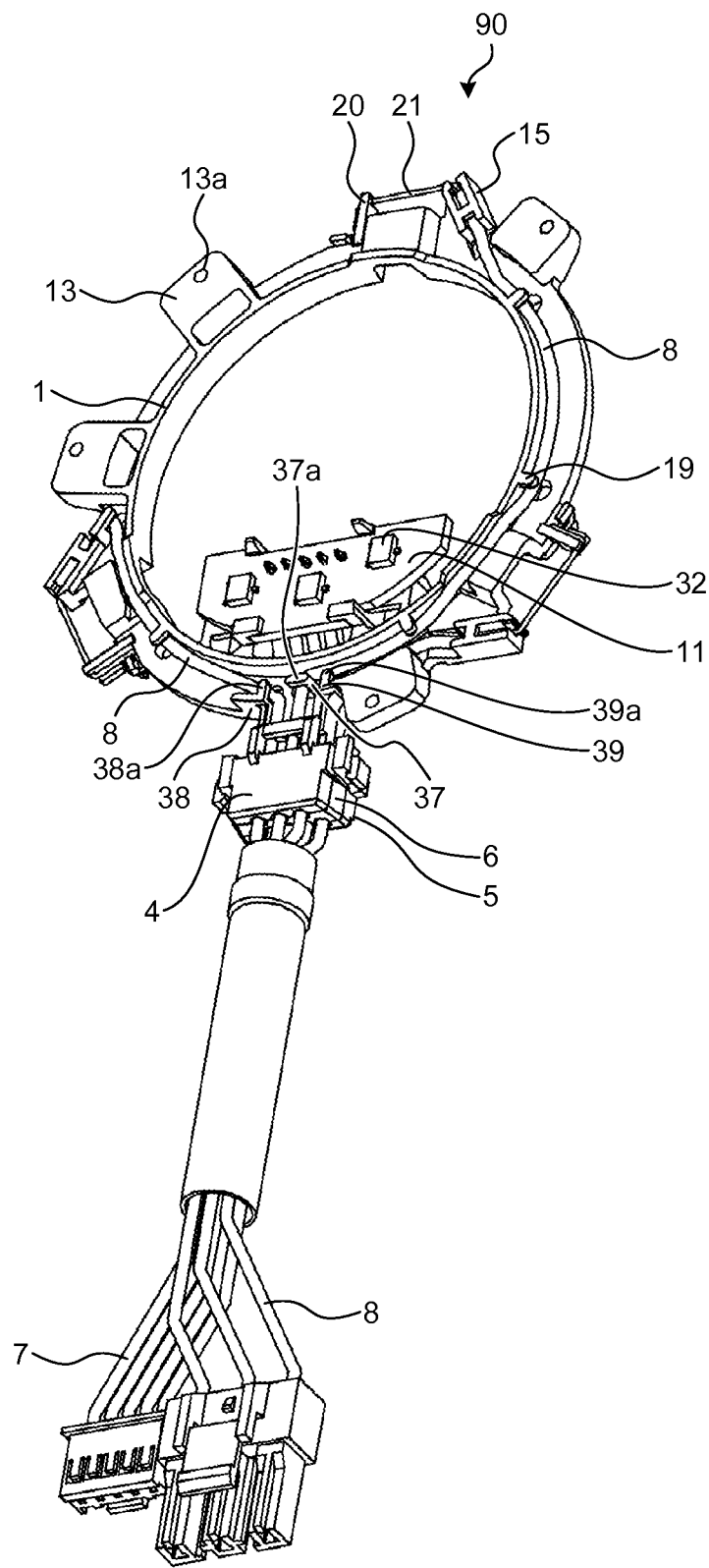
FIG. 2 is a perspective view of a lead wire assembly according to the first embodiment.
Figure 3:
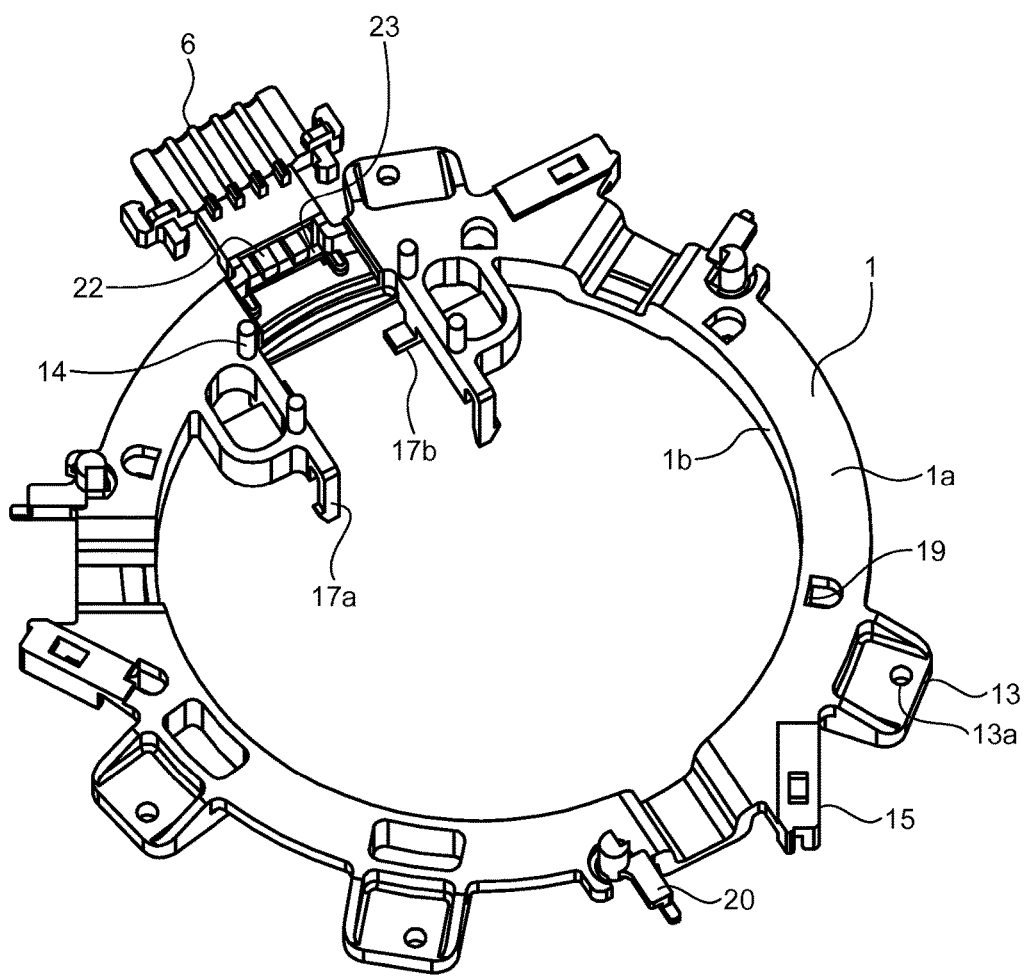
FIG. 3 is a perspective view of a lead wire wiring component with a lead wire leading component according to the first embodiment assembled thereto.
Figure 4:
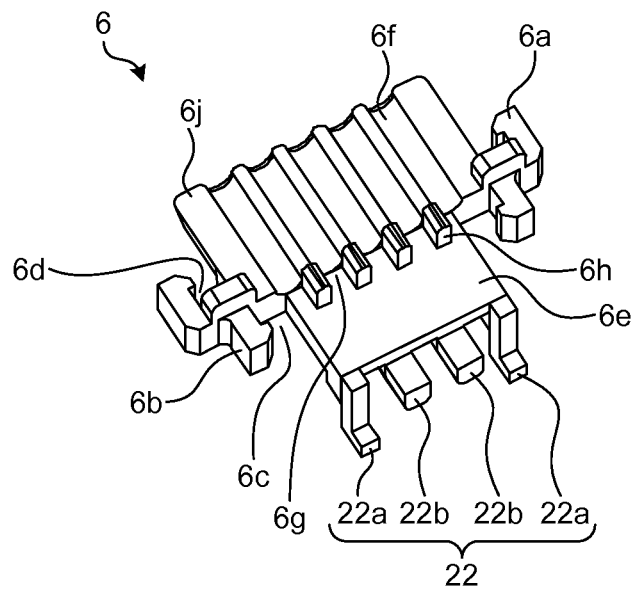
FIG. 4 is a perspective view of the lead wire leading component according to the first embodiment.
Figure 5:
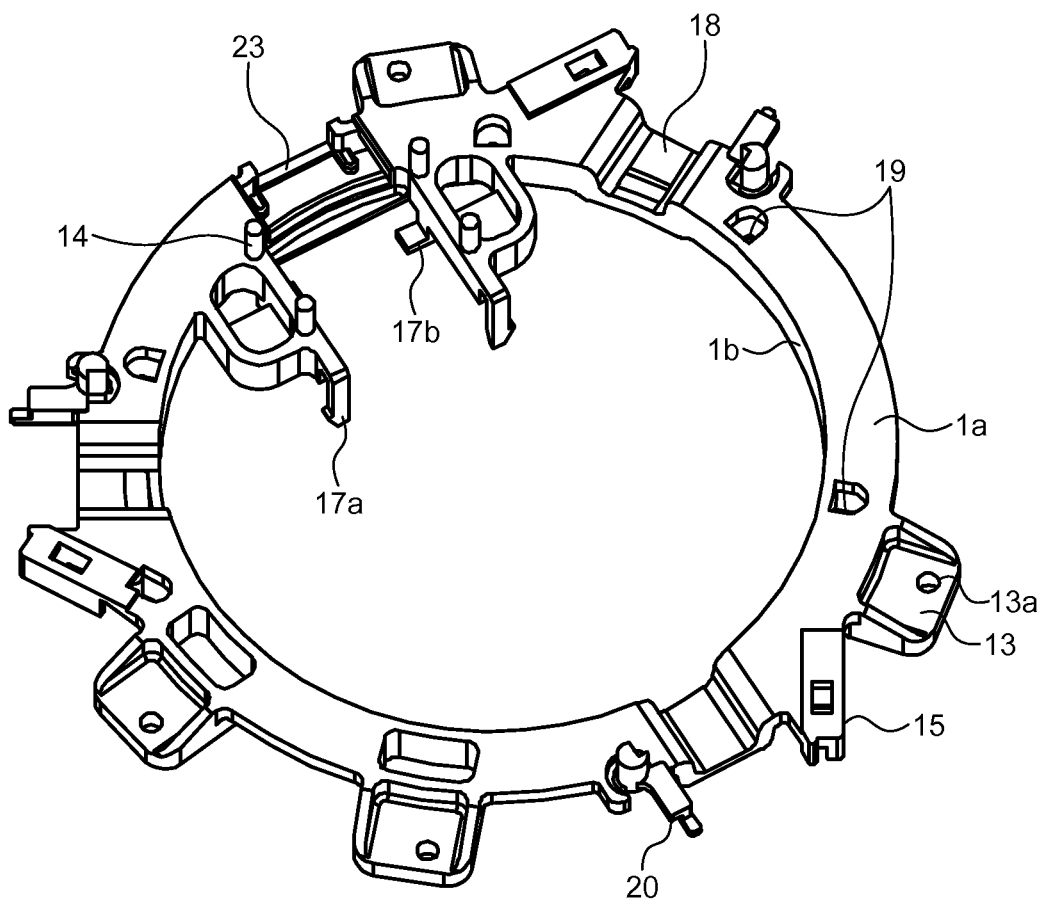
FIG. 5 is a perspective view of the lead wire wiring component according to the first embodiment.
Figure 6:
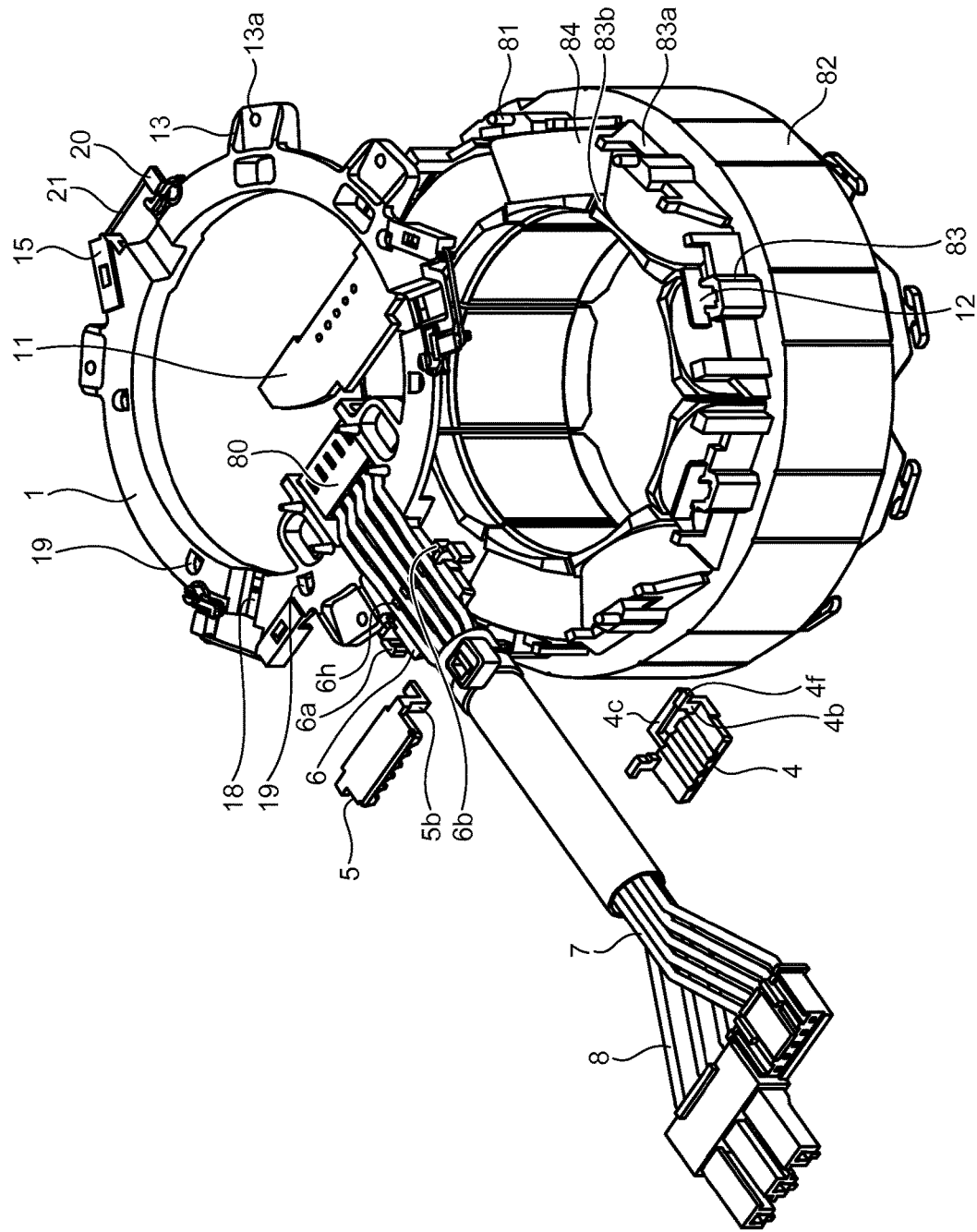
FIG. 6 is an exploded view of the stator assembly of an electric motor according to the first embodiment.

FIG. 1 is a perspective view illustrating the configuration of a stator assembly of an electric motor according to the present embodiment; FIG. 2 is a perspective view of a lead wire assembly; FIG. 3 is a perspective view of a lead wire wiring component with a lead wire leading component assembled thereto; FIG. 4 is a perspective view of the lead wire leading component; FIG. 5 is a perspective view of the lead wire wiring component; and FIG. 6 is an exploded view of the stator assembly of the electric motor. The configuration of an electric motor stator according to the present embodiment will now be described with reference to FIGS. 1 to 6.

A stator assembly 30 includes an annular stator 10, a lead wire wiring component 1, which is assembled to an end of the stator 10 in the axial direction and on which sensor lead wires 7 and power supply lead wires 8 are laid, a sensor substrate 11 (substrate), which is assembled to the lead wire wiring component 1 and to which the sensor lead wires 7 are connected via a board-in connector 80, a lead wire leading component 6, which leads the sensor lead wires 7 and the power supply lead wires 8, a power-supply-lead-wire retaining component 4, which is assembled to the lead wire leading component 6 and retains the power supply lead wires 8, and a sensor-lead-wire retaining component 5, which is assembled to the lead wire leading component 6 and retains the sensor lead wires 7 (FIG. 1).

The stator 10 includes a stator core 82, which is formed by stamping magnetic steel sheets into strips and stacking the strips by a method such as crimping, welding, and bonding, insulation 83 provided on the stator core 82, coils 84, which are magnet wires wound on the insulation 83 provided on teeth 31 of the stator core 82, and terminals 12, which are supported by the insulation 83.

The insulation 83 is molded from thermoplastic resin, such as PBT (polybutylene terephthalate), to be integral with the stator core 82 or is provided by molding the thermoplastic resin and then assembling it to the stator 10. One end of each of the magnet wires is routed to a hook portion 85 of one of the terminals 12 and joined to the hook portion 85 by fusing, soldering, or the like; the other ends of the magnet wires of all the phases are put together to form a neutral point. The strip-like core forming the stator core 82 provided with the insulation 83, the coils 84, the terminals 12, and other components is bent into a ring with abutting portions welded together to form the stator 10.

The side of the stator core 82 on which the terminals 12 are provided in the axial direction is hereinafter referred to as the connection side, and the opposite side is hereinafter referred to as the counter-connection side. The "axial direction" represents the axial direction of the stator core 82.

The insulation 83 includes an insulation outer wall 83a, which prevents the coils 84 from falling toward the outer circumference side. A plurality of pins 81 is provided on the insulation outer wall 83a on the connection side for attaching the lead wire wiring component 1 to the stator 10 (FIG. 6). The insulation 83 includes an insulation inner wall 83b, which prevents the coils 84 from falling toward the inner circumference side. The insulation inner wall 83b has a projection (not shown) on the counter-connection side. The projection (not shown) provided on the counter-connection side comes into contact with a core metal portion of a mold when the stator 10 is placed on the core metal portion of the mold for molding, to be used as a contact stopper in the axial direction.

The insulation outer wall 83a has a slightly greater length in the axial direction than the coils 84. The insulation outer wall 83a also has a slightly greater height on the counter-connection side than the coils 84 on the counter-connection side. Each of the coils 84 has a lesser length in the axial direction toward the insulation inner wall 83b from the insulation outer wall 83a. Each of the coils 84 also has a lesser height on the counter-connection side toward the insulation inner wall 83b from the insulation outer wall 83a. Setting the height of the projection (not shown) of the insulation inner wall 83b on the counter-connection side to be the same as that of the insulation outer wall 83a on the counter-connection side can ensure a sufficient distance in the axial direction from the end of the stator 10 on the counter-connection side to the coils 84. With such a configuration, when the stator 10 is placed on the core metal portion of the mold with the counter-connection side of the stator 10 facing down, the coils 84 do not come into contact with the core metal portion of the mold and thus the stator 10 can be placed in a stable manner. This enables improvement of the productivity and thereby also improves the quality.

A lead wire assembly 90 includes the lead wire wiring component 1, the sensor substrate 11, the sensor lead wires 7, the power supply lead wires 8, the board-in connector 80, the lead wire leading component 6, the power-supply-lead-wire retaining component 4, and the sensor-lead-wire retaining component 5 (FIGS. 2 and 1). In FIG. 2, the lead wire assembly 90 is viewed from the stator 10 side.

The power supply lead wires 8 are connected to a power supply (not shown) to supply electric power to the coils 84. The power supply lead wires 8 are routed to the terminals 12 to which the ends of the magnet wires are joined and are joined to these terminals 12 by spot welding, soldering or the like, with their covering stripped off.

Electronic components, such as a Hall IC 32, are mounted on the sensor substrate 11. The Hall IC 32, which serves as a position detecting element (circuit) for a rotor, is mounted on the face of the sensor substrate 11 on the counter-connection side.

An end of each of the sensor lead wires 7 is connected to the board-in connector 80. The end in this case refers to the end to be inside the molding. The board-in connector 80 is installed on the face of the sensor substrate 11 on the connection side and the terminal of the board-in connector 80 exposed to the substrate surface is joined to the sensor substrate 11 by soldering. This electrically connects the sensor lead wires 7 to the electronic components on the sensor substrate 11 via the board-in connector 80.

The power supply lead wires 8 and the sensor lead wires 7 are laid by using the lead wire wiring component 1 and exposed to the outside of the stator 10 from the lead wire leading component 6 assembled to the outer periphery of the lead wire wiring component 1.

The lead wire wiring component 1 includes an annular plate 1a, an inner wall 1b, attaching legs 13, projections 14, lead-wire-end retention portions 15, assembling legs 17a and 17b, recesses 18, positional displacement prevention projections 19, and wire core retention portions 20 (FIGS. 3 and 5).

The annular plate 1a is made by forming thermoplastic resin, such as PBT, into a ring. The annular plate 1a is provided with the attaching legs 13 on the outer circumference side for use in assembly of the lead wire wiring component 1 to the stator 10. The number of the attaching legs 13 is, for example, four. The attaching legs 13 have holes 13a, into which the pins 81 are inserted. The attaching legs 13 come into contact with the installation surface of the insulation 83 on the stator 10 when the lead wire wiring component 1 is assembled to the stator 10. In this manner, the lead wire wiring component 1 is positioned in the axial direction. The lead wire wiring component 1 is also positioned in the rotation direction by the pins 81, which are inserted into the holes 13a of the attaching legs 13.

The annular plate 1a is provided with the three lead-wire-end retention portions 15 on the outer circumference side, the number of which corresponds to the number of the power supply lead wires 8 (three). The annular plate 1a is also provided with the wire core retention portions 20 on the outer circumference side such that they are paired with the lead-wire-end retention portions 15. Each of the wire core retention portions 20 is disposed with a certain distance from one of the lead-wire-end retention portions 15.

The annular plate 1a is provided with the assembling legs 17a and 17b and the projections 14 on the inner circumference side for assembling the sensor substrate 11. The number of each of the assembling legs 17a and 17b is, for example, one, and the number of the projections 14 is, for example, four. The assembling legs 17a and 17b are disposed on the inner circumference side of the leading portion of the lead wire wiring component 1, to which the lead wire leading component 6 is attached. The assembling legs 17a and 17b have thin wall structures so that molding pressure exerted on the sensor substrate 11 during the molding can be distributed. Additionally, the projections 14 come into contact with the mold during the molding such that the stator 10 is positioned in the axial direction.

The annular plate 1a has the inner wall 1b on the inner circumference side for routing the power supply lead wires 8 from the lead wire leading component 6 to the lead-wire-end retention portions 15. The inner wall 1b has the positional displacement prevention projections 19 that project toward the outside in the radial direction for preventing the axial positional displacement of the power supply lead wires 8 laid by using the lead wire wiring component 1 (FIG. 2). The power supply lead wires 8 are positioned in the axial direction by the positional displacement prevention projections 19.

The three-phase power supply lead wires 8 are routed to the terminals 12 that are arranged in the circumferential direction of the stator 10 at intervals of approximately 120°. The ends of the power supply lead wires 8 are stripped of the covering such that wire cores 21 are exposed. The wire cores 21 are brought into contact with the walls of the lead-wire-end retention portions 15 such that the wire cores 21 are positioned. The wire cores 21 of the power supply lead wires 8 drawn out from the lead-wire-end retention portions 15 are routed to the wire core retention portions 20. The wire cores 21 are retained by the wire core retention portions 20 such that the wire cores 21 and the terminals 12 are in proximity to each other when the lead wire wiring component 1 is assembled to the stator 10.

The annular plate 1a also has the recesses 18 for electrodes to ensure spaces for the hook portions 85, which are the electrodes that sandwich the terminals 12 and the wire cores 21, when the lead wire wiring component 1 is assembled to the stator 10 and the wire cores 21 and the terminals 12 are spot welded. Hence, the power supply lead wires 8 are routed toward the stator 10 side beyond the flat surface (lead wire routing surface) of the annular plate 1a on the stator 10 side, and the power supply lead wires 8 are positioned in the axial direction by the positional displacement prevention projections 19 provided on both sides of the recesses 18.

To assemble the lead wire wiring component 1 to the stator 10, the three-phase power supply lead wires 8 are routed along the inner wall 1b toward the lead wire leading component 6 and are bent in the direction of the lead wire leading component 6 at respective turning portions 37, 38, and 39 (FIG. 2). The power supply lead wires 8 that are bent are retained by fitting them into power-supply-lead-wire retention portions (not shown) provided in the lead wire leading component 6 in the circumferential direction for three phases. The turning portions 37, 38, and 39 have projection 37a, 38a, 39a, respectively, for preventing the positional displacement of the power supply lead wires 8.

The power supply lead wire 8 that is retained by the circumferentially middle power-supply-lead-wire retention portion (not shown) in the lead wire leading component 6 is routed to the farthest lead-wire-end retention portion 15 from the lead wire leading component 6. The power supply lead wires 8 that are retained by the circumferentially side power-supply-lead-wire retention portions (not shown) in the lead wire leading component 6 are routed to the lead-wire-end retention portions 15 on the respective sides from the lead wire leading component 6. Either one of these two power supply lead wires 8 is routed radially outside the power supply lead wire 8 that is laid to the farthest lead-wire-end retention portion 15.

The lead wire wiring component 1 includes a lead wire guide 23 in a region on the outer circumference side in which the lead wire leading component 6 is attached to the lead wire wiring component 1, i.e., at a position facing the lead wire leading component 6. The lead wire guide 23 is shaped like, for example, a flat plate. The lead wire guide 23 guides the sensor lead wires 7 and the power supply lead wires 8 to the lead wire leading component 6. The lead wire guide 23 can also inhibit the axial movement of the sensor lead wires 7 and the power supply lead wires 8 routed on the lead wire wiring component 1. The lead wire leading component 6 is detachably attached to the lead wire guide 23.

The lead wire leading component 6 includes a planar base portion 6j, a pair of engaging portions 6a (first engaging portions), each of which is provided on a corresponding one of the two sides of the base portion 6j, a pair of engaging portions 6b (second engaging portions), each of which is provided on a corresponding one of the two sides of the base portion 6j, a planar portion 6e formed integrally with the base portion 6j and extending from the base portion 6j toward the lead wire wiring component 1, a plurality of retaining projections 6h provided on the face of the planar portion 6e on the counter-stator side and forming a sensor-lead-wire retention portion 6g for retaining the sensor lead wires 7, and a plurality of projection portions 22 projecting from the end of the planar portion 6e toward the lead wire wiring component 1 (FIG. 4).

The base portion 6j has grooves 6f on its face on the counter-stator side, the number of which is the same as the number of the sensor lead wires 7 (five in the illustrated example) for laying the sensor lead wires. The base portion 6j has grooves (not shown) on its face on the stator side, the number of which is the same as the number of the power supply lead wires 8 (three) for laying the power supply lead wires. The number of the retaining projections 6h is smaller than the number of the sensor lead wires 7 by one. Retaining projections (not shown) forming the power-supply-lead-wire retention portions (not shown) are provided on the face of the planar portion 6e on the stator side for retaining the power supply lead wires 8.

The projection portions 22 are arranged such that they face the lead wire guide 23 and extend, for example, inward in the radial direction from the lead wire leading component 6. The projection portions 22 are made up of, for example, projection portions 22a and 22b that are arranged in the axial direction at the interval of substantially the thickness of the lead wire guide 23 and are formed in two stages above and below the lead wire guide 23. The projection portion 22b extends linearly toward the axial center; the projection portion 22a extends in the axial direction, and then bent in the radial direction to extend linearly toward the axial center. The number of the projection portions 22a is, for example, two, and the two projection portions 22a are separated from each other in the circumferential direction. The number of the projection portions 22b is also, for example, two, and the two projection portions 22b are separated from each other in the circumferential direction.

The lead wire leading component 6 can be assembled to the lead wire wiring component 1 by fitting the projection portions 22 into the lead wire guide 23. More specifically, by fitting the projection portions 22 into the lead wire guide 23 such that the lead wire guide 23 on its both surfaces is interposed between the projection portions 22a and 22b, the lead wire leading component 6 can be assembled to the lead wire wiring component 1. By pulling the projection portions 22, which have been fitted into the lead wire guide 23, outward in the radial direction, the lead wire leading component 6 can be detached from the lead wire wiring component 1 with ease.

By assembling the lead wire leading component 6 to the lead wire wiring component 1 such that the lead wire wiring component 1 and the lead wire leading component 6 can be handled as one piece, the laying of the sensor lead wires 7 and the power supply lead wires 8 can be facilitated. Additionally, even if a load is applied to the sensor lead wires 7 and the power supply lead wires 8 during the transportation of the stator 10 with the sensor lead wires 7 and the power supply lead wires 8 assembled thereto, no load is applied to the joints between the power supply lead wires 8 and the stator 10 or the joints between the sensor lead wires 7 and the sensor substrate 11, because the lead wire leading component 6 is assembled to the lead wire wiring component 1. This improves the assembly workability and the quality. The projection portions 22 also have a function to guide the sensor lead wires 7 and the power supply lead wires 8, which are drawn from the lead wire wiring component 1, to the lead wire leading component 6.

While, in the present embodiment, the lead wire leading component 6 is assembled to the lead wire wiring component 1 in such a manner that the lead wire guide 23 is interposed between the projection portions 22a and 22b, which are separated into stages above and below the lead wire guide 23, this is not a limitation. Any other structure may be used as long as the lead wire leading component 6 can be detachably assembled to the lead wire wiring component 1. For example, the lead wire guide 23 may have a region having insertion holes, into which the projection portions 22 can be inserted, such that the lead wire leading component 6 is assembled to the lead wire wiring component 1 by inserting the projection portions 22 into the insertion holes. In addition to the portions extending toward the lead wire wiring component 1, the projection portions 22 may also have portions that extend, for example, in the axial direction as long as the projection portions 22 can be assembled to the lead wire wiring component 1. Additionally, the lead wire leading component 6 may include a structure different from the projection portions (any structure that allows the mounting) such that the lead wire leading component 6 is assembled to the lead wire wiring component 1 with such a structure. Furthermore, a different component may be provided between the lead wire leading component 6 and the lead wire wiring component 1 such that the lead wire leading component 6 is assembled to the lead wire wiring component 1. In other words, the lead wire leading component 6 may be assembled to and detached from the lead wire wiring component 1 in any manner. Note that, in a second embodiment, an example will be described in which a projection portion different from the projection portions 22a and 22b is used to assemble the lead wire leading component 6 to the lead wire wiring component 1.

Additionally, the projection portions 22 may include a hook portion (not shown) that is engaged with the lead wire guide 23. For example, the projection portion 22b may have an end that is substantially L-shaped such that the end of the projection portion 22b slightly extends in the axial direction toward the projection portion 22a to form the hook portion (not shown). The hook portion (not shown) can be held to the end of the lead wire guide 23 on the axial center side. In this case, the length of the projection portion 22a in the radial direction is required to be at least equal to the width of the lead wire guide 23. Note that the hook portion (not shown) may be provided on the projection portion 22b or on both of the projection portions 22a and 22b. Additionally, the lead wire guide 23 may include an engagement portion (not shown) that engages the hook portion (not shown). By holding the hook portion (not shown) of the projection portions 22 to the lead wire guide 23, the lead wire leading component 6 and the lead wire wiring component 1 can be assembled together in a more robust manner.

The engaging portions 6a are formed such that they extend in the circumferential direction from circumferential side faces of the base portion 6j and are then bent outward in the radial direction. An opening portion 6d that opens outward in the radial direction is formed between the end of each of the engaging portions 6a and the base portion 6j. The sensor-lead-wire retaining component 5 includes legs 5b (FIG. 6) that are inserted into the opening portions 6d. Specifically, the engaging portions 6a are used to assemble the sensor-lead-wire retaining component 5 to the lead wire leading component 6. By inserting the legs 5b of the sensor-lead-wire retaining component 5 into the opening portion 6d inward in the radial direction, the sensor-lead-wire retaining component 5 is assembled to the lead wire leading component 6.

The engaging portions 6b extend radially inwardly from the circumferential side faces of the base portion 6j. An opening portion 6c that opens inward in the radial direction is formed between an end of each of the engaging portions 6b and the base portion 6j. The power-supply-lead-wire retaining component 4 has legs 4b (FIG. 6) that are inserted into the opening portions 6c. Specifically, the engaging portions 6b are used to assemble the power-supply-lead-wire retaining component 4 to the lead wire leading component 6. By inserting the legs 4b of the power-supply-lead-wire retaining component 4 into the opening portions 6c outward in the radial direction, the power-supply-lead-wire retaining component 4 is assembled to the lead wire leading component 6.

The power-supply-lead-wire retaining component 4 includes the pair of legs 4b, which extend in the vertical direction from the face on which the lead wire leading component 6 is installed, and projections 4f provided on the ends of the legs 4b and extending in a direction orthogonal to the axial direction.

When the power supply lead wires 8 have been laid on the lead wire wiring component 1, the legs 4b are engaged with the engaging portions 6b of the lead wire leading component 6 to assemble the power-supply-lead-wire retaining component 4 to the lead wire leading component 6. At this point in time, the power-supply-lead-wire retaining component 4 is positioned in the axial direction by the projections 4f. The power-supply-lead-wire retaining component 4 has a rib 4c, which comes into contact with the lead wire leading component 6 when the power-supply-lead-wire retaining component 4 is engaged with the lead wire leading component 6. This can reduce the size of the opening through which the power supply lead wires 8 in the lead wire leading component 6 are exposed.

The sensor-lead-wire retaining component 5 includes the legs 5b, which are engaged with the lead wire leading component 6, and is assembled to the lead wire leading component 6 inward in the radial direction when the sensor lead wires 7 have been routed.

The sensor substrate 11 is assembled to the lead wire wiring component 1 by using the assembling legs 17a and 17b and the projections 14 of the lead wire wiring component 1. After the assembly of the sensor substrate 11 to the lead wire wiring component 1, the board-in connector 80 is soldered onto the sensor substrate 11. The sensor lead wires 7 are laid on the face of the lead wire wiring component 1 opposite to the face at which the power supply lead wires 8 are laid (the face of the lead wire wiring component 1 on the counter-stator side) and routed toward the lead wire leading component 6. The sensor lead wires 7 are retained lightly by the retaining projections 6h of the lead wire leading component 6 and the legs 4b of the power-supply-lead-wire retaining component 4.

In the manner described above, the power supply lead wires 8 are routed on the face of the lead wire wiring component 1 on the stator side, and the sensor lead wires 7 are routed on the face of the lead wire wiring component 1 on the counter-stator side. This facilitates assembling and enables reduction in cost. The facilitation of assembling enables improvement in quality.

Additionally, by retaining the power supply lead wires 8 with the positional displacement prevention projections 19 of the annular plate 1a such that the positional displacement in the axial direction is prevented, improvement in quality is enabled.

Additionally, by providing the two types of engaging portions (the engaging portions 6a and the engaging portions 6b) on the lead wire leading component 6, the sensor lead wires 7 are retained by the sensor-lead-wire retaining component 5 and the power supply lead wires 8 are retained by the power-supply-lead-wire retaining component 4. This enables the sensor lead wires 7 and the power supply lead wires 8 to be assembled to the lead wire leading component 6 robustly, improving the reliability and thereby enabling improvement in quality.

Furthermore, the legs 4b of the power-supply-lead-wire retaining component 4 are also used for retaining the sensor lead wires 7, and this facilitates the assembling and enables reduction in cost. The facilitation of assembling enables improvement in quality.

The lead wire wiring component 1 is assembled to the stator 10 when the sensor lead wires 7 and the power supply lead wires 8 have been laid. During the assembly, the pins 81 of the stator 10, which are exposed through the holes 13a in the attaching legs 13, are subjected to thermal welding, ultrasonic welding, or the like such that the lead wire wiring component 1 is fixed to the stator 10. Then, the wire cores 21 and the terminals 12 are spot welded to electrically connect the power supply lead wires 8 and the terminals 12 and thereby obtain the stator assembly 30.

When the stator assembly 30 with the sensor lead wires 7 and the power supply lead wires 8 assembled thereto as described above is placed in a mold for molding, the lead wire leading component 6 is detached from the lead wire wiring component 1. Then, the stator assembly 30 is molded with molding resin, which is thermosetting resin, such as bulk molding compound (BMC), to obtain a molded stator.

Since the lead wire leading component 6 is pushed outward in the radial direction from the center during the molding of the stator assembly 30, the lead wire leading component 6 is kept detached from the lead wire wiring component 1 after the molding and thus can maintain a predetermined position without coming into contact with the stator core 82. This prevents the sensor lead wires 7 or the power supply lead wires 8 from making a wire-to-wire contact as much as the wires laid on the lead wire wiring component 1 and thus can inhibit the entry of moisture along the interface between the lead wire leading component 6 and the molding resin to the extent possible, thereby enabling improvement in quality of the stator 10.

Additionally, when the stator 10 is placed in the mold, the projection (not shown) formed on the insulation inner wall 83b on the counter-connection side is supported by a placement portion formed on the mold. The placement portion is, for example, a stepped portion having an outer diameter slightly larger than the inner diameter of the stator core 82, a plurality of claws extending in a projecting manner from an installation surface in the opening portion of the core metal portion of the mold toward the stator 10 side, or a plurality of projections extending from the bracket installation surface in proximity to the core metal portion of the mold in a manner such that the projections do not connect with the inner diameter of the stator core 82.

Since the stator 10 is supported by the placement portion of the mold as described above, there is no need for the mold (a restraining member) to support the outer periphery of the stator 10. Thus, no boundary surface between the stator core 82 and the molding resin is formed on the contour of the molded stator.

Furthermore, in the case of the stator 10 supported with projections of the mold, the projection (not shown) formed on the insulation inner wall 83b on the counter-connection side is not exposed to the inner diameter side of the stator core 82 even when the molded stator is placed in the mold. This can further enhance the effect of inhibiting the entry of water.

Figure 7:
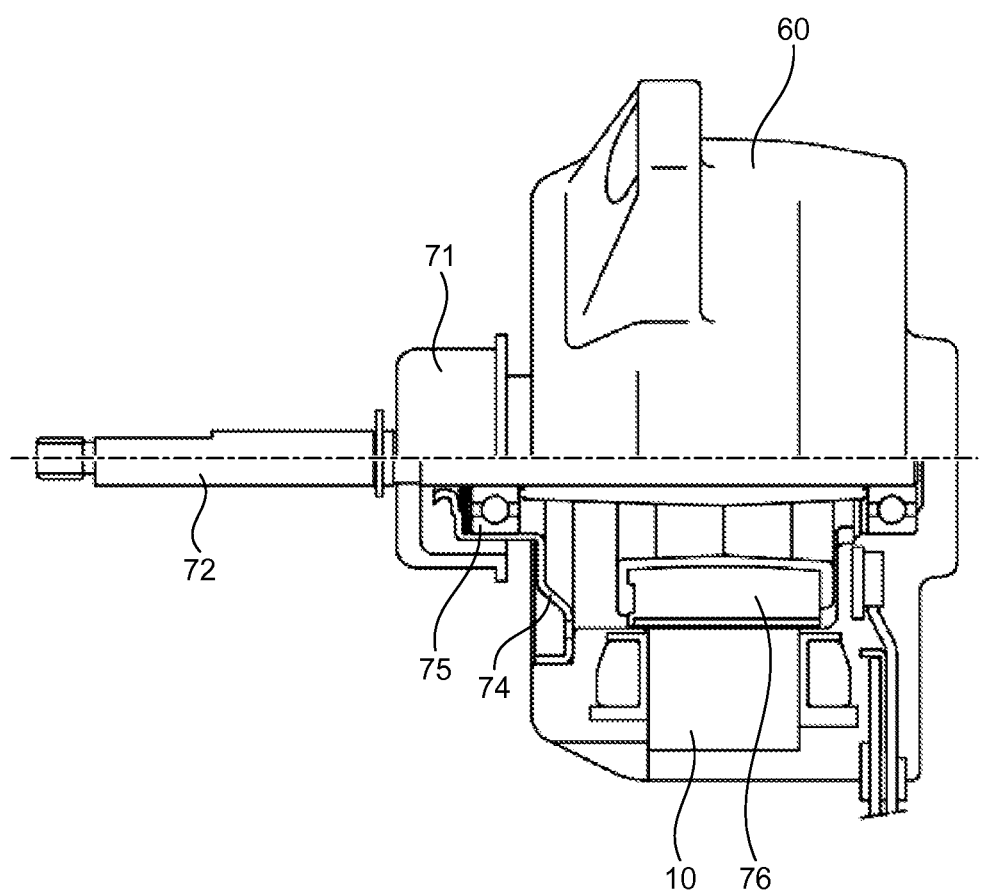
FIG. 7 is a diagram illustrating an exemplary configuration of an electric motor according to the first embodiment.

FIG. 7 is a diagram illustrating an exemplary configuration of an electric motor according to the present embodiment. The electric motor according to the present embodiment includes the stator 10 illustrated in FIG. 1. The electric motor includes, as its major components, a molded stator 60, which is formed by molding the stator 10 with molding resin (which will be a molding resin portion after the molding), a rotor 76, which is arranged rotatably inside the molded stator 60, a shaft 72, which is integrally attached to the rotor 76, a bearing 75, which supports the shaft 72, a bracket 74, which supports the bearing 75, and a watertight cap 71 for preventing moisture from entering the bearing 75.

Figure 8:
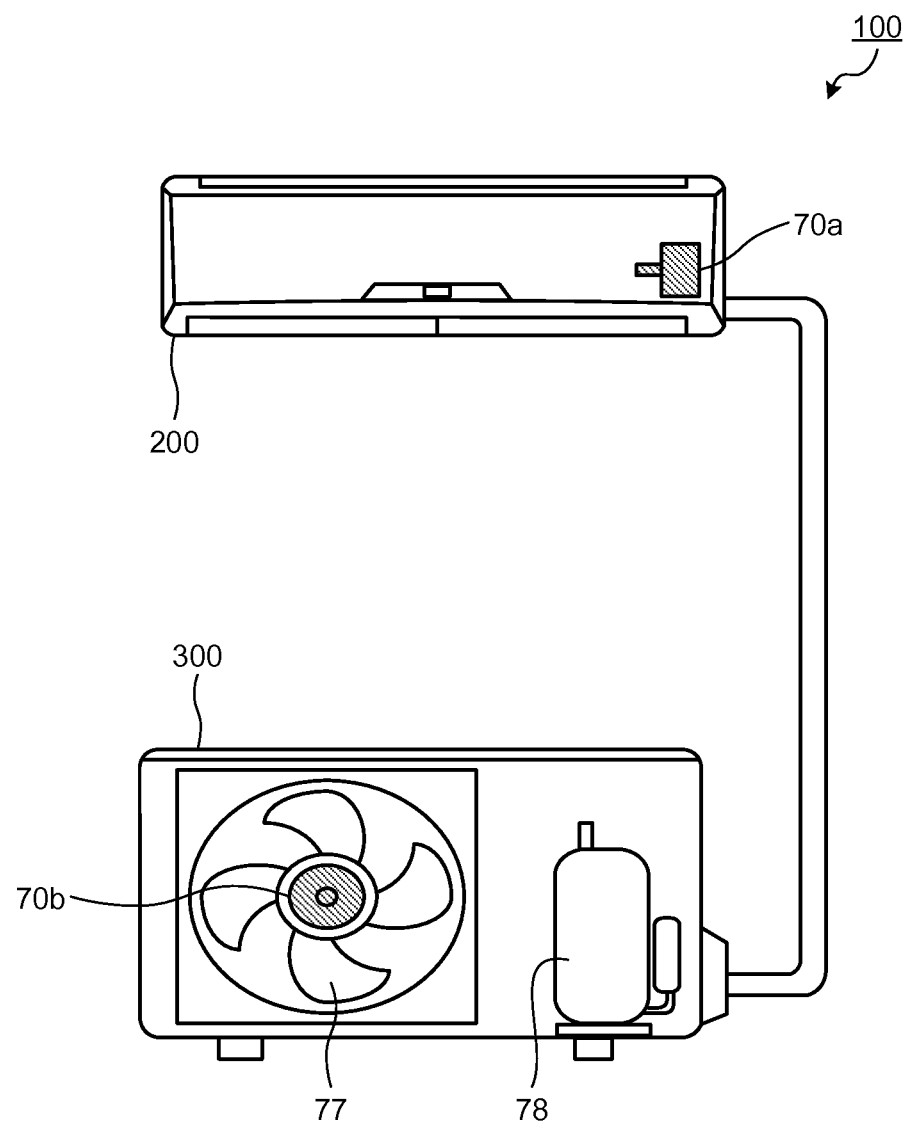
FIG. 8 is a diagram illustrating an exemplary configuration of an air conditioner that incorporates the electric motor according to the first embodiment.

FIG. 8 is a diagram illustrating an exemplary configuration of an air conditioner that incorporates the electric motor according to the present embodiment. An air conditioner 100 includes an indoor unit 200 and an outdoor unit 300 connected to the indoor unit 200. The indoor unit 200 includes an electric motor 70*a* as a driving source for a fan, and the outdoor unit 300 includes an electric motor 70*b* as a driving source for a fan. Each of the electric motors 70*a* and 70*b* is, for example, the molded electric motor illustrated in FIG. 7, which includes the stator 10 in FIG. 1. A fan 77, which is rotated by the electric motor 70*b*, and a compressor 78 are illustrated inside the outdoor unit 300.

Figure 9:
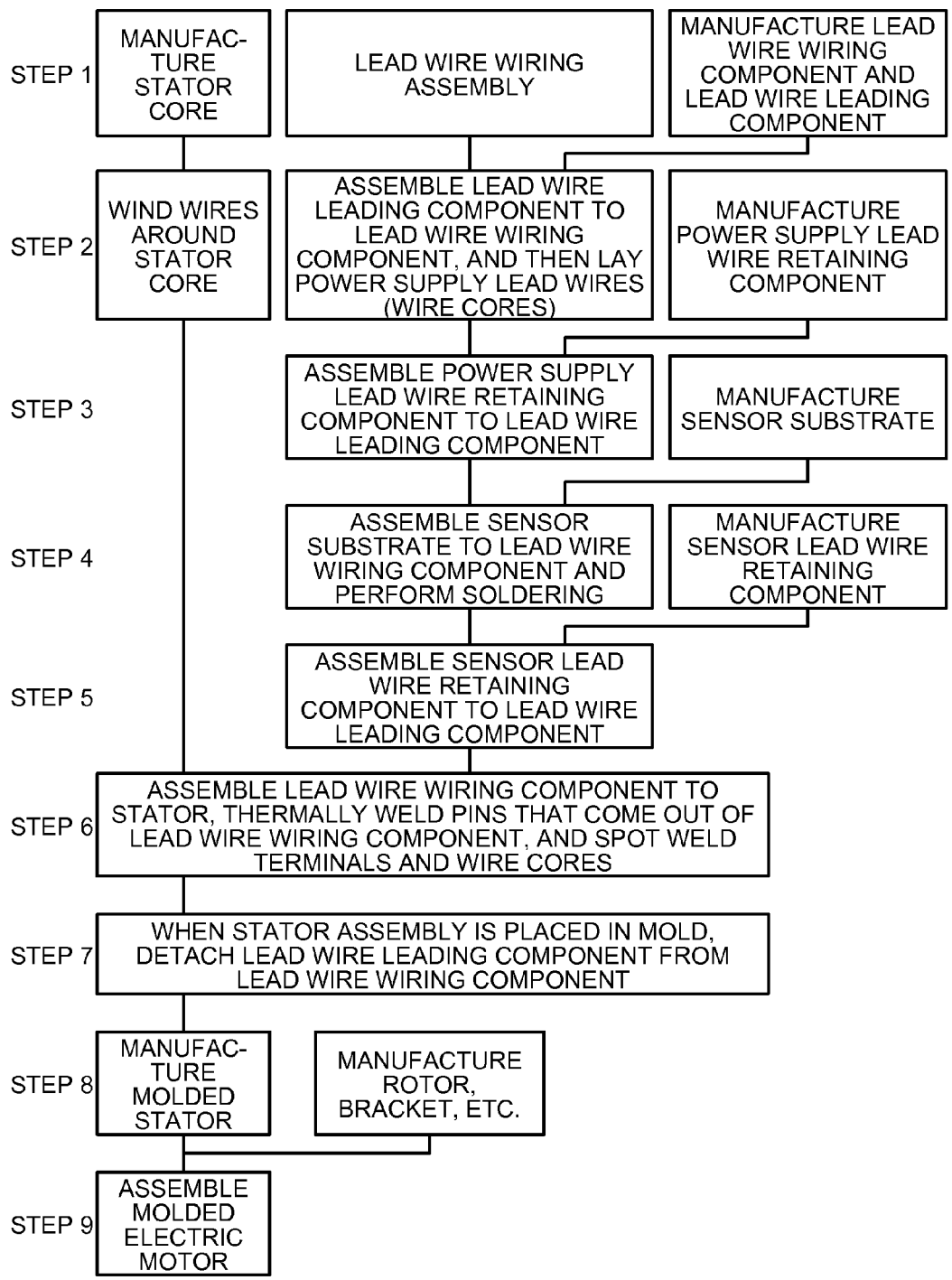
FIG. 9 is a diagram illustrating an exemplary method of manufacturing the electric motor according to the first embodiment.

FIG. 9 is a diagram illustrating an exemplary method of manufacturing the electric motor according to the present embodiment. This method of manufacturing the electric motor of course includes a method of manufacturing the stator of the electric motor. The manufacturing process of the electric motor according to the present embodiment will now be described with reference to FIG. 9.

(1) Step 1: The stator core 82 is manufactured. A lead wire wiring assembly (the sensor lead wires 7, the power supply lead wires 8, and the board-in connector 80) is also manufactured. The lead wire wiring component 1 and the lead wire leading component 6 are also manufactured.

(2) Step 2: Wires are wound on the stator core 82 to form the coils 84. The lead wire leading component 6 is assembled to the lead wire wiring component 1, and, then, the power supply lead wires 8 are also laid on the lead wire wiring component 1. At this point in time, the wire cores 21 of the power supply lead wires 8 are routed to the wire core retention portions 20. The power-supply-lead-wire retaining component 4 is also manufactured.

(3) Step 3: The power-supply-lead-wire retaining component 4 is assembled to the lead wire leading component 6. The sensor substrate 11 is also manufactured.

(4) Step 4: The sensor substrate 11 is assembled to the lead wire wiring component 1. The terminal of the board-in connector 80 is soldered to the sensor substrate 11. The sensor-lead-wire retaining component 5 is also manufactured.

(5) Step 5: The sensor-lead-wire retaining component 5 is assembled to the lead wire leading component 6.

(6) Step 6: The lead wire wiring component 1 is assembled to the stator 10. The pins 81 that come out of the attaching legs 13 of the lead wire wiring component 1 are thermally welded. The terminals 12 and the wire cores 21 are spot welded.

(7) Step 7: When the stator assembly 30 is placed in a mold, the lead wire leading component 6 is detached from the lead wire wiring component 1.

(8) Step 8: The stator assembly 30 is molded to manufacture the molded stator. Other components, such as the rotor and the bracket, are also manufactured.

(9) Step 9: Components, such as the rotor, are assembled to the molded stator to manufacture the electric motor.

As described above, the present embodiment provides the lead wire guide 23, which guides the power supply lead wires 8 and the sensor lead wires 7 to the lead wire leading component 6, on the lead wire wiring component 1 and provides the projection portions 22, which can be assembled to the lead wire guide 23, on the lead wire leading component 6 in such a manner that the lead wire leading component 6 can be attached to and detached from the lead wire wiring component 1.

The configuration as described above allows the lead wire leading component 6 to be detached from the lead wire wiring component 1 when the stator assembly 30 is placed in a mold. As a result, the lead wire leading component 6 is detached from the lead wire wiring component 1 in the molding resin portion after the molding. This can inhibit the entry of moisture along the interface between the lead wire leading component 6 and the molding resin to the extent possible, thereby enabling improvement in quality of the stator 10.

Since the lead wire leading component 6 is pushed outward from the center by the molding pressure during the molding of the stator assembly 30, the lead wire leading component 6 is kept detached from the lead wire wiring component 1 after the molding and thus can maintain a predetermined position without coming into contact with the stator core 82. In other words, there is no risk of the lead wire leading component 6 being pushed back inward in the radial direction to come into contact with the stator core 82 after the molding. Detaching the lead wire leading component 6 from the lead wire wiring component 1 before the molding allows the lead wire leading component 6 to be kept separated from the lead wire wiring component 1 after the molding.

Additionally, even if a load is applied to the power supply lead wires 8 and the sensor lead wires 7 during the transportation of the stator 10 with the power supply lead wires 8 and the sensor lead wires 7 assembled thereto, no load is applied to the joints between the power supply lead wires 8 and the stator 10 or the joints between the sensor lead wires 7 and the sensor substrate 11, because the lead wire leading component 6 is assembled to the lead wire wiring component 1 to achieve temporary fixing. This improves the assembly workability and the quality.

Additionally, the projection portions 22 according to the present embodiment extend from the lead wire leading component 6 inward in the radial direction of the stator 10.

Because of the configuration as described above, moving the lead wire leading component 6 outward in the radial direction to detach the lead wire leading component 6 from the lead wire wiring component 1 before the molding causes the lead wire leading component 6 to be pushed outward from the center by the molding pressure during the molding. This keeps the lead wire wiring component 1 and the lead wire leading component 6 separated from each other after the molding.

The projection portions 22 according to the present embodiment are made up of the projection portions 22*a* and 22*b* that are separated from each other in the axial direction by substantially the thickness of the lead wire guide 23.

By fitting the lead wire guide 23 of the lead wire wiring component 1 between the projection portions 22*a* and 22*b* of the lead wire leading component 6, the lead wire leading component 6 can be assembled to the lead wire wiring component 1 with ease.

Additionally, the projection portions 22 of the lead wire leading component 6 may include the hook portion (not shown) for engaging with the lead wire guide 23 of the lead wire wiring component 1. This achieves the temporary fixing of the lead wire leading component 6 to the lead wire wiring component 1 in a robust manner.

Additionally, the use of the stator 10 according to the present embodiment, which is low in cost and high in quality, enables improvement in quality of an electric motor.

Additionally, the installation of the electric motor that includes the stator 10 on, for example, a fan in an outdoor unit enables improvement in quality of an air conditioner. Note that the electric motor according to the present embodiment may be of course used with an electrical apparatus other than an air conditioner.

While the stator 10 that includes the sensor substrate 11 has been described in the present embodiment, the present embodiment may be similarly applied to a case with no sensor substrate 11 provided. Additionally, while the sensor lead wires 7 and the power supply lead wires 8 are both laid on the lead wire wiring component 1 in present embodiment, the present embodiment may be similarly applied to a case with either the sensor lead wires 7 or the power supply lead wires 8 are laid. For example, in the case with no sensor substrate 11 provided, there is no need to lay the sensor lead wires 7. The power supply lead wires 8 only are laid in such a case. Additionally, while the power-supply-lead-wire retaining component 4 and the sensor-lead-wire retaining component 5 are assembled to the lead wire leading component 6 in the present embodiment, it is possible that they are not provided or that they are integral with the lead wire leading component 6.

As described above, the stator (the molded stator 60) of the electric motor according to the present embodiment includes the stator 10, the lead wire wiring component 1 that is assembled to one end of the stator 10 in the axial direction and on which a lead wire is laid, the lead wire leading component 6 that leads the lead wire, and the molding resin portion that integrally covers the stator 10, the lead wire wiring component 1, and the lead wire leading component 6. The lead wire wiring component 1 includes the lead wire guide 23 that guides the lead wire to the lead wire leading component 6. The lead wire leading component 6 can be assembled to the lead wire guide 23. The lead wire leading component 6 is detached from the lead wire guide 23 in the molding resin portion. The configuration as described above allows the lead wire leading component 6 to be detached from the lead wire wiring component 1 before molding. This can inhibit the entry of moisture along the interface between the lead wire leading component 6 and the molding resin portion, thereby enabling improvement in quality and reduction in cost. Note that the lead wire leading component 6 is assembled to the lead wire guide 23 when the stator is assembled and is detached from the lead wire guide 23 before the molding.

Additionally, the lead wire leading component 6 may have a structure that can be assembled to the lead wire guide 23. The lead wire leading component 6 preferably includes the projection portions 22 that can be assembled to the lead wire guide 23, and the projection portions 22 are detached from the lead wire guide 23 in the molding resin portion. Here, the projection portions 22 extend inward in the radial direction of the stator 10 from the lead wire leading component 6. The projection portions 22 include the projection portions 22a and 22b that are arranged such that they are separated from each other in the axial direction, and the lead wire leading component 6 can be assembled to the lead wire wiring component 1 by fitting the projection portions 22a and 22b into the lead wire guide 23. The projection portions 22 may include the hook portion that is engaged with the lead wire guide 23.

Second Embodiment

Figure 10:
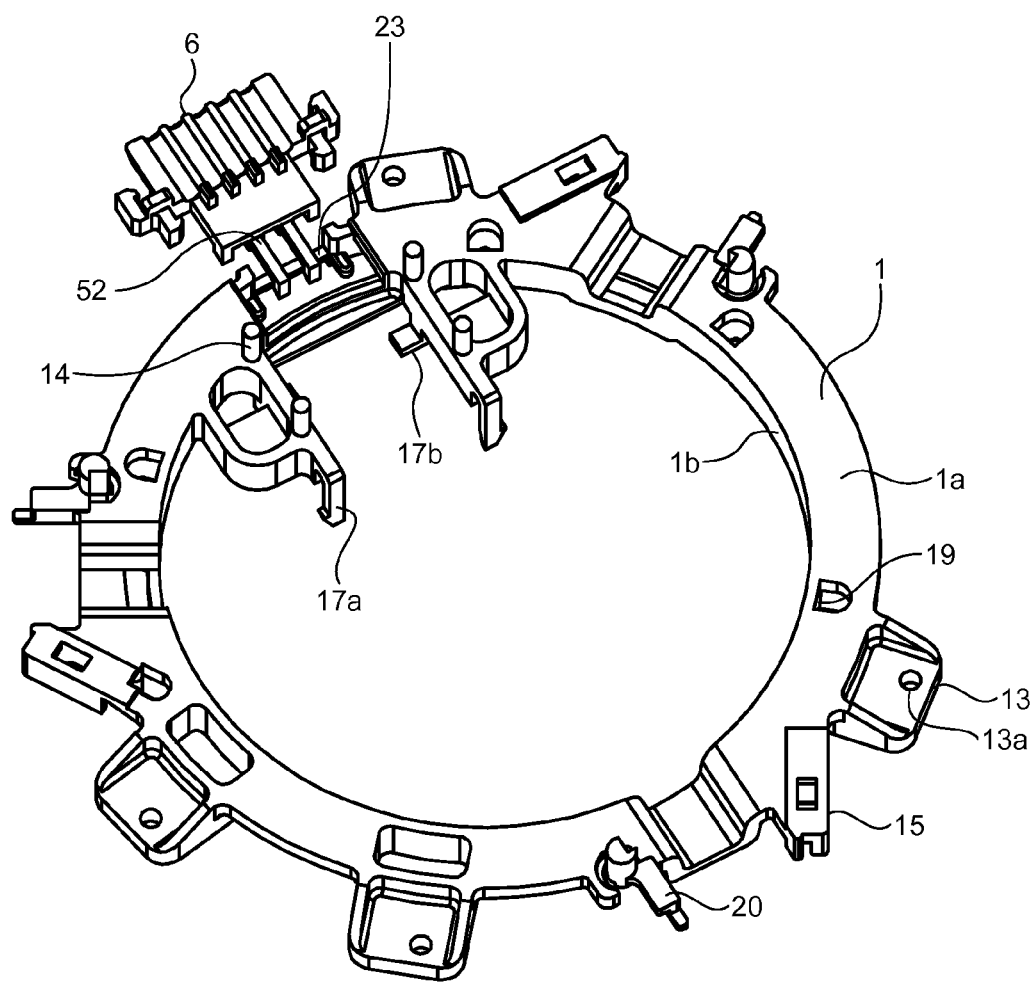
FIG. 10 is a perspective view of a lead wire wiring component with a lead wire leading component according to a second embodiment assembled thereto.
Figure 11:
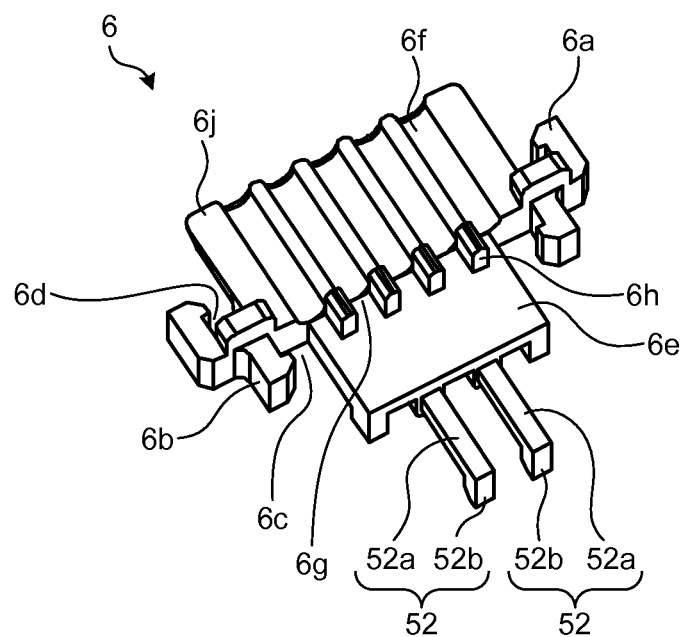
FIG. 11 is a perspective view of the lead wire leading component according to the second embodiment.
Figure 12:
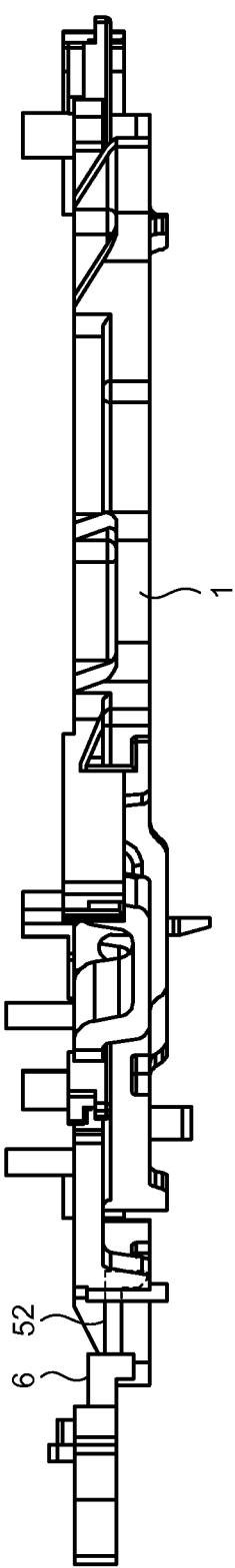
FIG. 12 is a sectional view of a lead wire wiring component with a lead wire leading component according to the second embodiment assembled thereto.

FIG. 10 is a perspective view of a lead wire wiring component with a lead wire leading component according to the present embodiment assembled thereto; FIG. 11 is a perspective view of the lead wire leading component according to the present embodiment. FIG. 12 is a sectional view of the lead wire wiring component with the lead wire leading component according to the present embodiment assembled thereto; FIG. 13 is a sectional view of the lead wire wiring component with the lead wire leading component according to the present embodiment separated therefrom.

FIGS. 1 and 2, and 5 to 9 described in the first embodiment are common to the present embodiment. Differences from the first embodiment will be mainly described below with the description common to the first embodiment omitted. In FIGS. 10 to 13, components identical with those in FIGS. 1 to 6 are designated with the identical symbols.

The lead wire wiring component 1 includes the lead wire guide 23 in a region on the outer circumference side in which the lead wire leading component 6 is attached to the lead wire wiring component 1, i.e., at a position facing the lead wire leading component 6 (FIG. 10). The lead wire guide 23 is shaped like, for example, a flat plate. The lead wire guide 23 guides the sensor lead wires 7 and the power supply lead wires 8 to the lead wire leading component 6. The lead wire guide 23 can also inhibit the axial movement of the sensor lead wires 7 and the power supply lead wires 8 routed on the lead wire wiring component 1. The lead wire leading component 6 is detachably attached to the lead wire guide 23.

The lead wire leading component 6 includes the planar base portion 6j, the pair of engaging portions 6a (first engaging portions), each of which is provided on a corresponding one of the two sides of the base portion 6j, the pair of engaging portions 6b (second engaging portions), each of which is provided on a corresponding one of the two sides of the base portion 6j, the planar portion 6e formed integrally with the base portion 6j and extending from the base portion 6j toward the lead wire wiring component 1, the retaining projections 6h provided on the face of the planar portion 6e on the counter-stator side and forming the sensor-lead-wire retention portion 6g for retaining the sensor lead wires 7, and a plurality of projection portions 52 projecting from the end of the planar portion 6e toward the lead wire wiring component 1 (FIG. 11).

The base portion 6j has the grooves 6f on its face on the counter-stator side, the number of which is the same as the number of the sensor lead wires 7 (five in the illustrated example) for laying the sensor lead wires. The base portion 6j has grooves (not shown) on its face on the stator side, the number of which is the same as the number of the power supply lead wires 8 (three) for laying the power supply lead wires. The number of the retaining projections 6h is smaller than the number of the sensor lead wires 7 by one. Retaining projections (not shown) forming the power-supply-lead-wire retention portions (not shown) are provided on the face of the planar portion 6e on the stator side for retaining the power supply lead wires 8.

The projection portions 52 are arranged such that they face the lead wire guide 23. The projection portions 52 extend from the lead wire leading component 6 inward in the radial direction and are then bent in the axial direction to extend in the axial direction toward the counter-substrate side of the stator 10 (the side on which the sensor substrate 11 is not provided). Specifically, the projection portions 52 are substantially L-shaped and are each made up of a radial direction portion 52a extending in the radial direction and an axial direction portion 52b provided toward the end beyond the radial direction portion 52a and extending in the axial direction. The number of the projection portions 52 is, for example, two and the projection portions 52 are separated from each other in the circumferential direction.

By moving the lead wire leading component 6 in the axial direction, the axial direction portions 52b of the projection portions 52 can be assembled to the lead wire guide 23 (FIGS. 10, 12, and 13). In FIG. 10, the substantially L-shaped projection portions 52 are assembled to the end of the lead wire guide 23 on the axial center side to achieve temporary fixing. Additionally, by pulling the projection portions 52, which are assembled to the lead wire guide 23, in the axial direction, the lead wire leading component 6 can be detached from the lead wire wiring component 1 with ease (FIGS. 12 and 13). Note that the illustration of the lead wire guide 23 is omitted in the FIGS. 12 and 13.

By assembling the lead wire leading component 6 to the lead wire wiring component 1 to achieve the temporary fixing such that the lead wire wiring component 1 and the lead wire leading component 6 can be handled as one piece, the laying of the sensor lead wires 7 and the power supply lead wires 8 is facilitated. Additionally, even if a load is applied to the sensor lead wires 7 and the power supply lead wires 8 during the transportation of the stator 10 with the sensor lead wires 7 and the power supply lead wires 8 assembled thereto, no load is applied to the joints between the power supply lead wires 8 and the stator 10 or the joints between the sensor lead wires 7 and the sensor substrate 11, because the lead wire leading component 6 is assembled to the lead wire wiring component 1. This improves the assembly workability and the quality. The projection portions 52 also have a function to guide the sensor lead wires 7 and the power supply lead wires 8, which are drawn from the lead wire wiring component 1, to the lead wire leading component 6.

Note that the mode of assembling the lead wire leading component 6 to the lead wire wiring component 1 is not limited to the example described above. Any other structure may be used as long as the lead wire leading component 6 can be detachably assembled to the lead wire wiring component 1. For example, the lead wire guide 23 may have insertion holes, into which the axial direction portions 52b of the projection portions 52 can be inserted, such that the lead wire leading component 6 is assembled to the lead wire wiring component 1 by inserting the axial direction portions 52b of the projection portions 52 into the insertion holes. Additionally, the projection portions 52 may have any structure as long as the projection portions 52 have at least the axial direction portions 52b.

Additionally, the projection portions 52 may include hook portions (not shown) that are engaged with the lead wire guide 23. For example, the axial direction portions 52b of the projection portions 52 may have ends that slightly extend outward in the radial direction to form the hook portions (not shown). The hook portions (not shown) can be held to the end of the lead wire guide 23 on the axial center side. Additionally, the lead wire guide 23 may include an engagement portion (not shown) that engages the hook portions (not shown). By holding the hook portions (not shown) of the projection portions 52 to the lead wire guide 23, the lead wire leading component 6 and the lead wire wiring component 1 can be assembled together in a more robust manner.

The other parts of the configuration of the present embodiment are identical with the first embodiment. When the stator assembly 30 with the sensor lead wires 7 and the power supply lead wires 8 assembled thereto is placed in a mold for molding, the lead wire leading component 6 is detached from the lead wire wiring component 1. Then, the stator assembly 30 is molded with molding resin, which is thermosetting resin, such as bulk molding compound (BMC), to obtain a molded stator.

Since the lead wire leading component 6 is moved in the axial direction to detach the lead wire leading component 6 from the lead wire wiring component 1, the lead wire leading component 6 and the lead wire wiring component 1 can be separated from each other during the process of placing the stator 10 with the sensor lead wires 7 and the power supply lead wires 8 assembled thereto in a mold for molding the stator 10. Specifically, the lead wire leading component 6 as assembled to the lead wire wiring component 1 is installed at a position shifted for a predetermined distance in the axial direction from a predetermined position on the stator 10 after the molding. By proceeding with the placement of the stator 10 into the mold after the lead wire leading component 6 has come into contact with the mold with the power-supply-lead-wire retaining component 4 therebetween, a predetermined axial clearance is created between the lead wire wiring component 1 assembled to the stator 10 and the lead wire leading component 6.

Since the lead wire leading component 6 is pushed outward in the radial direction from the center by the molding pressure during the molding of the stator assembly 30, the lead wire leading component 6 is kept detached from the lead wire wiring component 1 after the molding and thus can maintain a predetermined position without coming into contact with the stator core 82. In other words, there is no risk of the lead wire leading component 6 being pushed back inward in the radial direction or in the axial direction to come into contact with the stator core 82 after the molding. Detaching the lead wire leading component 6 from the lead wire wiring component 1 before the molding allows the lead wire leading component 6 to be kept separated from the lead wire wiring component 1 after the molding. Hence, the present embodiment prevents the sensor lead wires 7 or the power supply lead wires 8 from making a wire-to-wire contact as much as the wires laid on the lead wire wiring component 1 and thus can inhibit the entry of moisture along the interface between the lead wire leading component 6 and the molding resin to the extent possible, thereby enabling improvement in quality of the stator 10.

Additionally, the stator of an electric motor according to the present embodiment can be used in an electric motor as illustrated in FIG. 7, as in the case of the first embodiment. Additionally, the electric motor according to the present embodiment can be used in an air conditioner as illustrated in FIG. 8, as in the case of the first embodiment.

A method of manufacturing the electric motor according to the present embodiment is similar to that of the first embodiment. Of (1) step 1 to (9) step 9 into which the method of manufacturing the electric motor according to the first embodiment has been divided for the description, the difference of the present embodiment is: (7) Step 7: When the stator assembly 30 is placed in a mold, the lead wire leading component 6 is moved in the axial direction to be detached from the lead wire wiring component 1.

The other steps are identical with those in the first embodiment.

As described above, the present embodiment provides the lead wire guide 23, which guides the power supply lead wires 8 and the sensor lead wires 7 to the lead wire leading component 6, on the lead wire wiring component 1 and provides the projection portions 52, which can be assembled to the lead wire guide 23, on the lead wire leading component 6 in such a manner that the lead wire leading component 6 can be attached to and detached from the lead wire wiring component 1. Here, the projection portions 52 extend from the lead wire leading component 6 toward the other end of the stator 10 in the axial direction. More specifically, the projection portions 52 extend inward in the radial direction of the stator 10 from the lead wire leading component 6 and are then bent in the axial direction to extend toward the other end of the stator 10 in the axial direction.

The configuration as described above allows the lead wire leading component 6 to be detached from the lead wire wiring component 1 when the stator assembly 30 is placed in a mold. As a result, the lead wire leading component 6 is detached from the lead wire wiring component 1 in the molding resin portion after the molding. This can inhibit the entry of moisture along the interface between the lead wire leading component 6 and the molding resin to the extent possible, thereby enabling improvement in quality of the stator 10.

Since the lead wire leading component 6 is pushed outward from the center by the molding pressure during the molding of the stator assembly 30, the lead wire leading component 6 is kept detached from the lead wire wiring component 1 after the molding and thus can maintain a predetermined position without coming into contact with the stator core 82.

Additionally, even if a load is applied to the power supply lead wires 8 and the sensor lead wires 7 during the transportation of the stator 10 with the power supply lead wires 8 and the sensor lead wires 7 assembled thereto, no load is applied to the joints between the power supply lead wires 8 and the stator 10 or the joints between the sensor lead wires 7 and the sensor substrate 11, because the lead wire leading component 6 is assembled to the lead wire wiring component 1 to achieve the temporary fixing. This improves the assembly workability and the quality.

Additionally, the projection portions 52 includes the axial direction portions 52b that can be assembled to the lead wire guide 23 and extend in the axial direction toward the counter-substrate side of the stator 10. Thus, by moving the lead wire leading component 6 in the axial direction, the lead wire leading component 6 is assembled to the lead wire wiring component 1 or is detached from the lead wire wiring component 1.

Since the lead wire leading component 6 is moved in the axial direction to detach the lead wire leading component 6 from the lead wire wiring component 1, the lead wire leading component 6 and the lead wire wiring component 1 can be separated from each other during the process of placing the stator 10 with the power supply lead wires 8 and the sensor lead wires 7 assembled thereto in a mold for molding the stator 10.

Additionally, since the lead wire leading component 6 is moved in the axial direction to detach the lead wire leading component 6 from the lead wire wiring component 1, the position that the lead wires are lead to and that is provided after the molding of the electric motor is easily adjusted.

Additionally, the projection portions 52 of the lead wire leading component 6 may include the hook portions (not shown) for engaging with the lead wire guide 23 of the lead wire wiring component 1. This allows the temporary fixing of the lead wire leading component 6 to the lead wire wiring component 1 in a robust manner.

Additionally, the use of the stator 10 according to the present embodiment, which is low in cost and high in quality, enables improvement in quality of an electric motor.

Additionally, the installation of the electric motor that includes the stator 10 on, for example, a fan in an outdoor unit enables improvement in quality of an air conditioner. Note that the electric motor according to the present embodiment may be of course used with an electrical apparatus other than an air conditioner.

INDUSTRIAL APPLICABILITY

As described above, the present invention is useful as a stator of an electric motor, an electric motor, an air conditioner, and a method of manufacturing the stator of the electric motor.

The invention claimed is:

1. A stator of an electric motor, comprising:
a stator;
a lead wire wiring component that is assembled to one end of the stator in an axial direction and on which a lead wire is laid;
a lead wire leading component leading the lead wire; and
a molding resin portion integrally covering the stator, the lead wire wiring component, and the lead wire leading component, wherein
the lead wire wiring component includes a lead wire guide guiding the lead wire to the lead wire leading component,
the lead wire leading component is capable of being assembled to the lead wire guide, and
the lead wire leading component is separated from the lead wire wiring component in the molding resin portion.

2. The stator of an electric motor according to claim 1, wherein the lead wire leading component has a structure capable of being assembled to the lead wire guide.

3. The stator of an electric motor according to claim 1, wherein
the lead wire leading component includes a projection portion capable of being assembled to the lead wire guide, and
the projection portion is detached from the lead wire guide in the molding resin portion.

4. The stator of an electric motor according to claim 3, wherein the projection portion extends inward in a radial direction of the stator from the lead wire leading component.

5. The stator of an electric motor according to claim 4, wherein
the projection portion includes first and second projection portions that are arranged such that the first and second projection portions are separated from each other in the axial direction, and
the lead wire leading component is capable of being assembled to the lead wire wiring component by fitting the first and second projection portions into the lead wire guide.

6. The stator of an electric motor according to claim 3, wherein the projection portion extends from the lead wire leading component toward another end of the stator in the axial direction.

7. The stator of an electric motor according to claim 6, wherein the projection portion extends inward in the radial direction of the stator from the lead wire leading component and is then bent in the axial direction to extend toward the another end of the stator in the radial direction.

8. The stator of an electric motor according to claim 1, wherein the lead wire leading component is assembled to the lead wire guide when the stator is assembled, and the lead wire leading component is detached from the lead wire guide before molding.

9. An electric motor comprising the stator of an electric motor according to claim 1.

10. An air conditioner comprising the electric motor according to claim 9.

11. The stator of an electric motor according to claim 1, wherein
the lead wire wiring component includes an annular plate, and
the lead wire guide is provided at an outer circumference side of the annular plate.

12. A stator of an electric motor, comprising:
a stator;
a lead wire wiring component that is assembled to one end of the stator in an axial direction and on which a lead wire is laid;
a lead wire leading component leading the lead wire; and
a molding resin portion integrally covering the stator, the lead wire wiring component, and the lead wire leading component, wherein
the lead wire wiring component includes a lead wire guide guiding the lead wire to the lead wire leading component,
the lead wire leading component is capable of being assembled to the lead wire guide,
the lead wire leading component is detached from the lead wire guide in the molding resin portion,
the lead wire leading component includes a projection portion capable of being assembled to the lead wire guide, and
the projection portion is detached from the lead wire guide in the molding resin portion, and
wherein the projection portion includes a hook portion that is engaged with the lead wire guide.

13. A method of manufacturing a stator of an electric motor, the method comprising:
assembling a lead wire leading component to a lead wire guide of a lead wire wiring component;
laying a lead wire on the lead wire wiring component;
assembling the lead wire wiring component to a stator to manufacture a stator assembly;
detaching the lead wire leading component from the lead wire guide when the stator assembly is placed in a mold; and
integrally molding the stator assembly with molding resin.

* * * * *